(12) United States Patent
Oshida et al.

(10) Patent No.: US 8,368,004 B2
(45) Date of Patent: Feb. 5, 2013

(54) REFLECTION PLATE FOR OPTICAL ENCODER AND MANUFACTURING METHOD THEREOF, AND OPTICAL ENCODER

(75) Inventors: Satoru Oshida, Miyagi-gun (JP); Masaru Kato, Saitama (JP)

(73) Assignee: Nikon Corporation, Tokyo (JP)

( * ) Notice: Subject to any disclaimer, the term of this patent is extended or adjusted under 35 U.S.C. 154(b) by 34 days.

(21) Appl. No.: 12/714,995

(22) Filed: Mar. 1, 2010

(65) Prior Publication Data

US 2010/0193671 A1 Aug. 5, 2010

Related U.S. Application Data

(63) Continuation of application No. PCT/JP2008/065958, filed on Sep. 4, 2008.

(30) Foreign Application Priority Data

Sep. 5, 2007 (JP) ................................ 2007-229887
Dec. 28, 2007 (JP) ................................ 2007-339778

(51) Int. Cl.
*G01D 5/34* (2006.01)
*G01D 5/36* (2006.01)
*F21V 9/16* (2006.01)

(52) U.S. Cl. ............ 250/231.1; 250/231.13; 250/237 R; 250/459.1

(58) Field of Classification Search ......... 250/231.13–231.18, 230, 559.29, 250/559.32, 237 R, 237 G; 428/64.1, 64.2; 427/162; 205/116

See application file for complete search history.

(56) References Cited

U.S. PATENT DOCUMENTS

| 4,644,156 A | 2/1987 | Takahashi et al. |
| 4,661,697 A * | 4/1987 | Takahashi et al. ............. 250/233 |
| 6,814,897 B2 * | 11/2004 | Morita ........................ 264/1.33 |

FOREIGN PATENT DOCUMENTS

| JP | A-60-217361 | 10/1985 |
| JP | A-61-045923 | 3/1986 |
| JP | A-61-45923 | 3/1986 |
| JP | A-62-153710 | 7/1987 |
| JP | A-9-61195 | 3/1997 |
| JP | A-9-89591 | 4/1997 |
| JP | JA-9-273943 | 10/1997 |
| JP | A-2004-045063 | 2/2004 |
| JP | A-2004-45063 | 2/2004 |
| JP | A-2005-121593 | 5/2005 |
| JP | A-2007-119581 | 5/2007 |
| JP | A-2007-119851 | 5/2007 |
| JP | A-2007-121142 | 5/2007 |

OTHER PUBLICATIONS

Office Action issued in Chinese Patent Application No. 200880112634.9 dated May 18, 2011.(with translation).
International Search Report issued in International Application No. PCT/JP2008/065958, on Oct. 21, 2008 (with English Translation).
Written Opinion of the International Searching Authority issued in International Patent Application No. PCT/JP2008/065958 on Oct. 21, 2008.
Mar. 12, 2012 Chinese Office Action issued in CN 200880112634.9 (with English-language translation).
Apr. 10, 2012 Japanese Office Action issued in JP 2009-531269 (with English-language translation).
Aug. 31, 2012 Office Action issued in Chinese Patent Application No. 200880112634.9 (with translation).
Nov. 22, 2012 European Search Report issued in European Patent Application No. 08829312.1.

* cited by examiner

*Primary Examiner* — Georgia Y Epps
*Assistant Examiner* — Don Williams
(74) *Attorney, Agent, or Firm* — Oliff & Berridge, PLC

(57) ABSTRACT

A reflection plate for an optical encoder includes: a base material (1) with a reflecting surface; and a film (3) that is formed on a part of the reflecting surface and includes a non-electrolytic plating film or an electrolytic oxide film.

16 Claims, 9 Drawing Sheets

CONVENTIONAL EXAMPLE

CONVENTIONAL EXAMPLE

CONVENTIONAL EXAMPLE

CONVENTIONAL EXAMPLE

CONVENTIONAL EXAMPLE

CONVENTIONAL EXAMPLE

REFLECTION PLATE FOR OPTICAL ENCODER AND MANUFACTURING METHOD THEREOF, AND OPTICAL ENCODER

This is a Continuation application of International Patent Application No. PCT/ JP2008/065958, filed on Sep. 4, 2008, which claims priority to Japanese Patent Application No. 2007-229887, filed on Sep. 5, 2007, and Japanese Patent Application No. 2007-339778, filed on Dec. 28, 2007. The contents of the aforementioned applications are incorporated herein by reference.

TECHNICAL FIELD

The present invention relates to a reflection plate for an optical encoder and a manufacturing method thereof, and an optical encoder having the reflection plate.

BACKGROUND ART

An optical encoder is a position sensor for measuring the rotation angles or the movement distances of a subject. Known optical encoders include transmission-type encoders in which light that has passed through the slits provided in the encoder disc is detected by a light receiving element to perform positioning, and reflection-type encoders in which reflection regions and non-reflection regions are provided on the encoder disc, and light that have been reflected from the reflection regions are detected by a light receiving element to perform positioning.

For example, Japanese Patent Application Publication No. 2007-121142 discloses a reflection-type encoder disc (a reflection plate for an optical encoder) including: an optical disc; an absorption layer formed on a surface of the optical disc; and a reflection layer patterned on a surface of the absorption layer. Typically, a conventional reflection plate for an optical encoder in which a patterned reflection layer is arranged on the surface of a non-reflection layer is manufactured by the following method. That is as shown in FIGS. 13A to 13F, a non-reflection layer 25 is first formed on a base material 21 by vacuum evaporation, sputtering, or the like (FIG. 13A). Thereon, a reflection layer 26 is formed by vacuum evaporation, sputtering, or the like (FIG. 13B). Subsequently, after funning a photoresist film 22 on the reflection layer 26 (FIG. 13C), the photoresist film 22 is subjected to exposure via a photomask. The photoresist film 22 after exposure is subjected to development to form a resist pattern 22a (FIG. 13D). With the resist pattern 22a used as a mask, the reflection layer 26 is subjected to etching or the like to expose the non-reflection layer 25 (FIG. 13E). After that, the resist pattern 22a is removed to expose the patterned reflection layer 26 (FIG. 13F). As a result, a conventional reflection plate for an optical encoder whose surface has non-reflection regions and patterned reflection regions is obtained.

In manufacturing a reflection plate, such as a conventional reflection plate for an optical encoder, having a non-reflection layer and a reflection layer arranged thereon, each layer is typically deposited by a vacuum process such as vacuum evaporation, sputtering, or the like. However, typically, vacuum evaporation apparatuses are comparatively expensive, and require a comparatively high equipment cost. Furthermore, there is a possibility that, in some types of non-reflection layers and reflection layers, exfoliation is produced due to a stain or a scratch on the surface of the layer.

SUMMARY

Aspects according to the present invention have an object to provide a reflection plate for an optical encoder excellent in adhesion, and another object to provide a manufacturing method of a reflection plate for an optical encoder that is low in cost and high in productivity.

According to a first aspect of the present invention, there is provided a reflection plate for an optical encoder including: a base material with a reflecting surface; and a film that is formed on a part of the reflecting surface and includes a non-electrolytic plating film or an electrolytic oxide film.

According to the first aspect, a reflection plate for an optical encoder that is excellent in adhesion is provided.

According to a second aspect of the present invention, there is provided a manufacturing method of a reflection plate for an optical encoder including: preparing a base material with a reflecting surface; and forming a film on a part of the reflecting surface, the film including a non-electrolytic plating film or an electrolytic oxide film.

According to the second aspect, a manufacturing method of a reflection plate for an optical encoder that is low in cost and high in productivity is provided.

According to a third aspect of the present invention, there is provided an optical encoder includes the reflection plate for an optical encoder as set forth in the first aspect.

According to the third aspect, an optical encoder that is low in cost and excellent in durability is provided.

DESCRIPTION OF EMBODIMENTS

Figure 1:
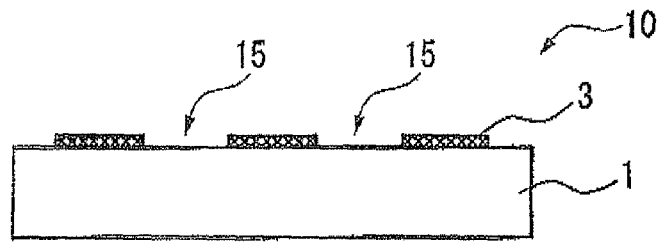
FIG. 1 is a cross-sectional view showing one embodiment of a reflection plate for an optical encoder.

Hereinafter is a description of embodiments of the present invention with reference to the drawings. However, the present invention is not limited to the drawings. In the following description and drawings, the same or corresponding elements are denoted by the same reference symbols, and repetitious description will be omitted.

First is a description of a reflection plate for an optical encoder in a first embodiment of the present invention. In the present embodiment, as shown in FIG. reflection plate 10 for an optical encoder includes: a base material 1 with a specular reflecting surface; and non-electrolytic plating films 3 formed on some parts of the reflecting surface. The non-electrolytic plating films 3 form non-reflection regions (low reflection regions, light-absorbing regions). The parts of the reflecting surface where the non-electrolytic plating films are not formed (the specular parts) form reflection regions 15.

In the present embodiment, the reflection region 15 is capable of reflecting light that is absorbed by the non-reflection region (the non-electrolytic plating film 3). The non-electrolytic plating film 3 as a non-reflection region has a reflectance lower than that of the reflection region 15. The non-electrolytic plating films 3 may include a plurality of elements with the same shape and/or a plurality of elements whose shapes are different from each other.

In the reflection plate 10, the pattern for position detection includes the non-electrolytic plating films 3 as non-reflection regions and the reflection regions 15. The minimum line width or minimum pitch of the pattern is set according to the resolution of the optical encoder, and can be set to, for example, 100, 90, 80, 70, 60, 50, 40, 30, 20, or not more than 10 μm, or alternatively to not less than 100 μm. A reflection plate having a pattern with a minimum line width or minimum pitch of not more than approximately 20 μm can be applicable to an optical encoder with a high resolution. Furthermore, a reflection plate having a minimum line width or minimum pitch of not more than approximately 10 μm or 5 μm can be applicable to an optical encoder with a higher resolution. In a reflection plate applicable to a high-resolution optical encoder, the minimum line width or minimum pitch of the pattern can be set to, for example, approximately 20, 18, 16, 14, 12, 10, 8, 6, 4, or not more than 2 μm.

In the present embodiment, the non-electrolytic plating films 3 formed on some parts of the reflecting surface of the base material 1 function as non-reflection regions. A non-electrolytic plating process utilizes a difference in standard redox potential (ionization tendency). In displacement plating reactions, electrons are exchanged between a substance with a high ionization tendency and a substance with a low ionization tendency. The constituent substances of the non-electrolytic plating film 3 have direct bonding with the reflecting surface, and the adhesion of the non-electrolytic plating film 3 with the reflecting surface (the specular surface) of the base material 1 is very strong. Use of a non-electrolytic plating process (wet process) is advantageous for avoiding use of a vacuum process when forming the reflection regions and the non-reflection regions, and/or for reducing the cost. Furthermore, use of a non-electrolytic plating process is advantageous for forming a high-resolution pattern (high-definition pattern), securing a predetermined film thickness, and/or obtaining uniformity in film thickness, and is preferably applicable to a reflection plate having a pattern applicable to a high-resolution optical encoder.

Figure 2:
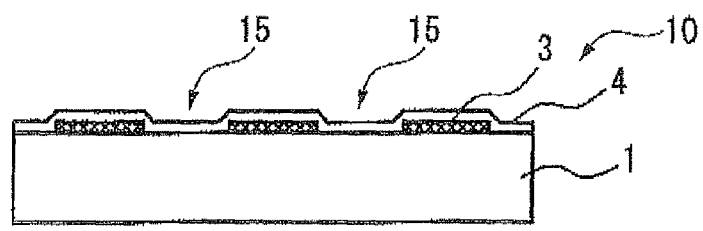
FIG. 2 is a cross-sectional view showing an example of a reflection plate provided with a protection film.
Figure 3A:
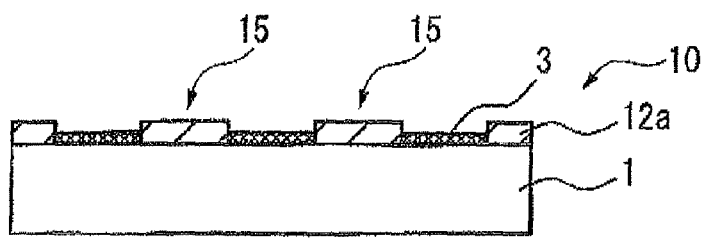
FIG. 3A is a cross-sectional view showing another example of a reflection plate provided with a protection film.
Figure 3B:
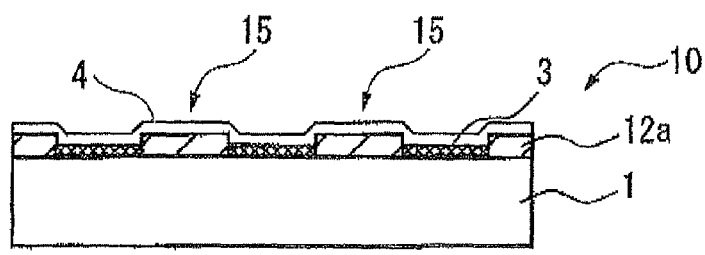
FIG. 3B is a cross-sectional view showing another example of a reflection plate provided with a protection film.

In the present embodiment, to prevent deterioration of the surface of the reflection plate 10, especially the reflection region (specular part) 15 due to oxidation or the like, at least the reflection region 15 can be covered with protection film(s) (coating film(s)) 4 and/or 12a, as shown in FIG. 2, FIG. 3A, and FIG. 3B. In the present embodiment, it is possible for the light reflected from the reflection region 15 to pass through the protection film(s) 4 and/or 12a.

In FIG. 2, the whole surface of the base material 1 including the reflection regions 15 and the non-reflection regions (the non-electrolytic plating films 3) is covered with the protection film 4. In FIG. 3A, only the reflection regions 15 axe each covered with a protection film 12a. In FIG. 3B, only the reflection regions 15 are each covered with a first protection film 12a and the whole surface of the base material 1 including the reflection regions 15 and the non-reflection regions (the non-electrolytic plating films 3) is covered with a second protection film 4. As a formation material for the protection films 4, 12a with a capability of transmitting light, a variety of known materials can be used.

In FIG. 3A, the photoresist used for the patterning of the non-electrolytic plating film 3 can be used as the protection films 12a. In this case, a transparent photoresist used in the manufacturing method (described later) is allowed to remain on the reflection regions 15 to protect the reflection regions 15. In FIG. 3B, the whole surface of the base material 1 including the aforementioned remaining transparent resist pattern (the protection films 12a) and the non-reflection regions (the non-electrolytic plating films 3) can be further covered with the protection film 4. Note "transparent" means transparent to the light that is used for the optical encoder.

The reflection plate 10 can be arranged instead of the conventional reflection plate equipped in a typical optical encoder, and hence is adoptable to various types of encoders such as a rotary encoder and a linear encoder.

Next is a description of a manufacturing method of the reflection plate 10. Furthermore, respective elements used for the reflection plate 10 will be additionally described. In the present embodiment, as shown for example in FIG. 4A to FIG. 4E or FIG. 5A to FIG. 5D, some parts of the specular reflecting surface provided on the base material 1 are subjected to a non-electrolytic plating process to form non-electrolytic plating films 3. To be more specific, a manufacturing method may be used that includes at least: (A1) a photoresist film formation step; (A2) a resist pattern formation step; and (A5) a non-electrolytic plating step, and further includes, as required: (A3) a caustic neutralization process step; (A4) a metal displacement film formation step; (A6) resist pattern removal step; and (A7) protection film formation step, the steps being as follows.

(A1) Photoresist Film Formation Step

Figure 4A:
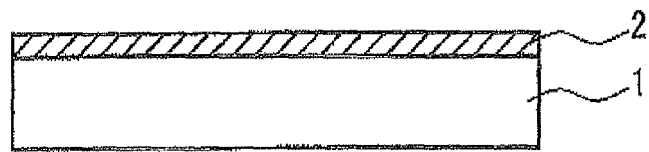
FIG. 4A is a cross-sectional view showing a reflection plate material after formation of a photoresist film.
Figure 4B:
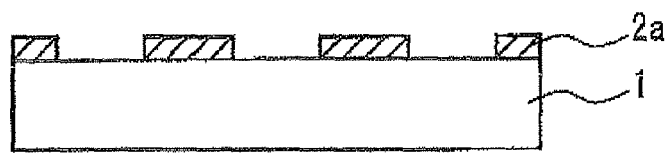
FIG. 4B is a cross-sectional view showing the reflection plate material of FIG. 4A after formation of a resist pattern thereon by being subjected to exposure and development.

First, a base material 1 with a specular reflecting surface is prepared, and a photoresist film 2 is formed on the reflecting surface (FIG. 4A). The base material 1 is not particularly limited so long as it is a base material having a specular reflecting surface and allows for formation of a non-electrolytic plating film on its reflecting surface by the non-electrolytic plating process. As such a base material 1, a base material made of an aluminum or an aluminum alloy is preferable because it is possible to form a preferable reflection plate. Furthermore, as the base material 1, one in which a metal layer made of an aluminium alloy or the like is formed on the surface of a host material such as a glass substrate or a transparent resin substrate can be used. In this case, the metal layer preferably has a thickness of approximately 0.2, 0.5, 1, 2, 3, 4, or not less than 5 μm, and more preferably has a thickness of not less than 1 μm. With a thickness of less than 1 μm, it tends to be difficult to obtain a metal layer with sufficient reflectance.

The specular reflecting surface of the base material 1 can be formed by performing mirror machining (mirror-like finishing). As the mirror machining method, conventionally known mirror machining methods such as polishing and grinding can be used. Among these conventionally known methods, grinding is preferable because it can form a desired reflecting surface at a low cost.

The reflectance of the reflecting surface is preferably, for example, approximately 40, 50, 60, 70, 80, or not less than 90%, and more preferably not less than 70%. if the reflectance of the reflecting surface is less than 70%, it tends to be difficult to obtain a reflection plate with high accuracy. Furthermore, the thickness, size, and shape of the base material 1 can be appropriately determined according to desired applications. Note that "reflectance" mean reflectance with respect to the light used for the optical encoder.

A photoresist film 2 is formed on the reflecting surface of the base material 1 by a conventionally known method. For example, a coating apparatus such as a spinner is used to spread a photoresist uniformly on the reflecting surface to form the photoresist film 2. The photoresist may be either positive type or negative type so long as it does not deteriorate through the respective processes (described later).

Figure 5A:
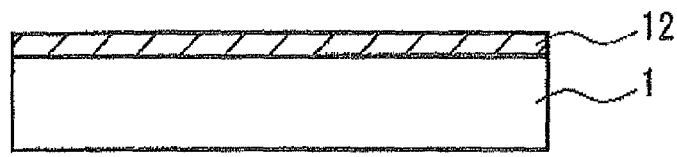
FIG. 5A is a cross-sectional view showing a reflection plate material after formation of a transparent photoresist film.

In the case when a transparent resist pattern (protection films 12a) remains on the reflection region 15 of the reflection plate as shown in FIG. 3, a transparent photoresist is used as the photoresist to form a transparent photoresist film 12 (FIG. 5A). The transparent photoresist is required not to deteriorate through the respective processes (described later) and in the environment of use of the reflection plate. Typically, one of negative type is used. However, one of positive type may be used so long as it does not deteriorate.

The formed photoresist film 2 or the transparent photoresist film 12 is subjected to a heating process (pre-bake) under predetermined conditions. The pre-bake conditions can be appropriately set according to the type of photoresist that is used and the like, (A2) Resist Pattern Formation Step Next, a photomask with a desired encoder pattern formed thereon is adherently or adjacently placed on or above the photoresist film 2 or the transparent photoresist film 12. Then, a light source such as a mercury lamp is used to irradiate energy rays at a predetermined wavelength onto the photoresist film 2 or the transparent photoresist film 12 from above the photomask, to thereby expose the photoresist film 2 or the transparent photoresist film 12 for a predetermined period of time. The exposure conditions can be appropriately set according to the type of the photoresist that is used and the like.

The photomask is not particularly limited. Usable photomasks include, for example, one in which an encoder pattern is formed on a glass substrate (preferably, a silica glass substrate) by use of chrome or the like.

After exposure, the photomask is removed, and a predetermined developer (developing solution) is used to perform a development. The type of developer and the development conditions can be determined according to the type of photoresist that is used and the like. In the case of the positive-type photoresist film, through the development process, the non-exposed parts remain on the base material 1 to form the resist pattern 2a or the transparent resist pattern 12a, and the exposed parts are eluted to expose some parts of the specular surface of the base material 1. In the case of the negative-type photoresist film, through the development process, the exposed parts remain on the base material 1 to form the resist pattern 2a or the transparent resist pattern 12a, and the non-exposed parts are eluted to expose some parts of the reflecting surface of the base material 1. In this manner, it is possible to obtain a reflection plate material (FIG. 4B or FIG. 5B) in which the resist pattern 2a or the transparent resist pattern 12a is foamed on the surface of the base material 1. Note that, as required, the resist pattern may be subjected to a heating process (post-bake) under predetermined conditions. The post-bake conditions can be appropriately set according to the type of photoresist that is used and the like.

(A3) Caustic Neutralization Process Step

In the present embodiment, the reflection plate material obtained in the step (A2) can be subjected, as required, to a caustic process by immersing the reflection plate material in a caustic solution. Through the caustic process, stains on the exposed parts of the reflecting surface are removed. The type of caustic solution cart be appropriately determined according to the type of base material that is used and the like. For example, in the case where a base material whose surface is made of an aluminum or an aluminum alloy is used as the base material 1, it is preferable that, as a caustic solution, a sodium hydroxide solution (more preferably, one with a concentration of 10 to 15 percent by mass) be used. Furthermore, the conditions for the caustic process (for example, the immersion temperature and the immersion time) can be appropriately set according to the types of base material and caustic solution that are used and the like.

Next, the reflection plate material that has been subjected to the caustic process is immersed, in a neutralizing solution to neutralize the exposed parts. The type of neutralizing solution can be appropriately determined according to the type of base material that is used, the type of caustic solution that is used, and the like. For example, in the case where a base material at least the surface of which is made of an aluminum or an aluminum alloy is subjected to a caustic process by a sodium hydroxide solution with a concentration of 10 to 15 percent by mass, it is preferable that, as a neutralizing solution, a nitric acid aqueous solution with a concentration of 2 to 8 percent by mass (for example, one in which nitric acid with a concentration of 67.5 percent by mass is diluted by pure water) be used. Furthermore, the conditions for the neutralization process (for example, the immersion temperature and the immersion time) can be appropriately set according to the types of base material and neutralizing solution that are used and the like.

Figure 4C:
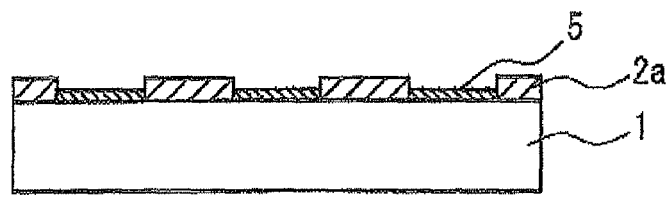
FIG. 4C is a cross-sectional view showing the reflection plate material of FIG. 4B after formation of a metal displacement film thereon.

(A4) Metal Displacement Film Formation Step
(A4-1) Metal Displacement Film Formation In the present embodiment, the reflection plate material obtained in the step (A2) or the step (A3) can be immersed, as required, in an alkaline solution (hereinafter, referred to as "solution for metal displacement film formation") contains metallic ions in which an ionization tendency of the metal is weaker than that of the metal forming the reflecting surface of the base material 1 and also, is stronger than that of the metal forming the non-electrolytic plating film 3. As a result, the metal of the exposed part of the reflecting surface is displaced with the metal in the solution for metal displacement film formation, to thereby form, on the exposed part, a metal displacement film 5 that includes the metal with an ionization tendency weaker than that of the metal forming the reflecting surface and also stronger than that of the metal forming the non-electrolytic plating film 3 (FIG. 4C or FIG. 5C). By forming a metal displacement film 5 on the exposed part, the metal in the metal displacement film is displaced with the plated metal in the non-electrolytic plating process (described later). This makes it possible to form non-electrolytic plating films with more adhesion to the reflecting surface of the base material 1.

The solution for metal displacement film formation can be appropriately determined according to the type of base material that is used, the type of non-electrolytic plating film that is formed, and the like. For example, if a base material at least the surface of which is made of an aluminium or an aluminum alloy is used as the base material 1 and non-electrolytic nickel-plating films or non-electrolytic-copper plating films are formed as the non-electrolytic plating films 3, it is preferable that an alkaline solution including zinc ions be used as the solution for metal displacement film formation. As a result, in the non-electrolytic plating process (described later), the displacement between the zinc and the nickel or the copper is facilitated. Therefore, it is possible to form non-electrolytic nickel-plating films or non-electrolytic copper-plating films on the surface of the aluminum or the aluminum alloy with ease.

The formation conditions of the metal displacement films (for example, the immersion temperature and the immersion time) can be appropriately set according to the types of base material and solution for metal displacement film formation that are used and the like. Furthermore, the thickness of the metal displacement film to be formed is not particularly limited. So long as only the metal on the surface of the exposed part is displaced, it is possible to form a non-electrolytic plating film with a high adhesion to the reflecting surface of the base material 1. Therefore, in this case, the metal displacement film may be thin.

In the present embodiment, the reflection plate material having the metal displacement films that are formed in this manner may be directly subjected to a non-electrolytic plating process. However, in order to form non-electrolytic plating films with higher adhesion to the reflecting surface, it is preferable that the metal displacement films be exfoliated from the reflection plate material and that new metal displacement films be formed. It is more preferable that the exfoliation and the formation of metal displacement films be repeated.

(A4-2) Exfoliation of Metal Displacement Film

An exfoliation process of the metal displacement films can be performed by immersing the reflection plate material in an acid. As a result, the metal in the metal displacement films are dissolved, and the parts of the reflecting surface of the base material 1 is exposed again. The acid used for the exfoliation of the metal displacement films can be appropriately determined according to the types of base material and metal displacement film that are used and the like. For example, if a base material at least the surface of which is made of en aluminum or an aluminum alloy is used as the base material 1 to form zinc displacement films, it is preferable that a nitric acid aqueous solution (more preferably, a nitric acid aqueous solution with a concentration of 2 to 8 percent by mass) be used as the acid. Furthermore, the exfoliation conditions of the metal displacement film (for example, the immersion temperature and the immersion time) can be appropriately set according to the types of base material and acid that axe used, the type of metal displacement films that are formed, and the like.

(A4-3) Metal Displacement Film Formation

In the above step of (A4-2), after exfoliation of the metal displacement films, metal displacement films are again formed on the exposed parts of the reflecting surface by a method similar to the above step of (A4-1). At this time, the solution for metal displacement film formation that is used and the formation conditions of the metal displacement films may be the same as or different from those in the above step of (A4-1). Furthermore, the thickness of the metal displacement film to be formed may be thin similarly to the above step of (A4-1).

In addition, in the case where the cycle of exfoliation and formation of metal displacement films is further repeated, the solution for metal displacement film formation and the acid, and the exfoliation conditions and formation conditions of metal displacement films that are used therefor may be the same as or different from those in the above step of (A4-1) and the above step of (A4-2).

The reason for the enhanced adhesion as a result of the exfoliation of the once-formed metal displacement film and the reformation of a metal displacement film is not quite clear. However, the present inventors assume as follows: with the exfoliation of the metal displacement film formed in the step of (A4-1), a fresh reflecting surface is exposed. When a metal displacement film is again formed on the exposed part, the metal particles of the metal displacement film become finer than those of the metal displacement film that was formed prior to this (the one that was exfoliated). The finer the metal particles are, the larger the surface area of the Metal displacement film is. This presumably leads to an improved adhesion of the non-electrolytic plating film that is formed on the new metal displacement film.

(A5) Non-Electrolytic Plating Step

Figure 4D:
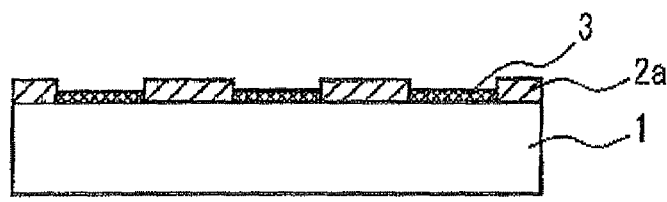
FIG. 4D is a cross-sectional view showing the reflection plate material of FIG. 4C after its metal displacement film is displaced with a non-electrolytic plating film.
Figure 4E:
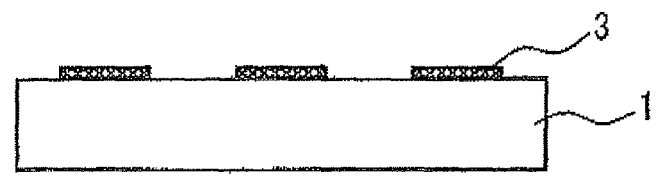
FIG. 4E is a cross-sectional view showing the reflection plate after the resist pattern of the reflection plate material shown in FIG. 4D is removed.

Next, the reflection plate material obtained in the step (A2) or the reflection plate material having the metal displacement films that is obtained in the step (A4) is immersed in a non-electrolytic plating solution to form a non-electrolytic plating film on the exposed parts of the reflecting surface. When the reflection plate material in which some parts of the reflecting surface of the base material 1 are exposed (the one obtained in the step (A2)) is immersed in the non-electrolytic plating solution, the metal to be plated is precipitated on the exposed parts to form non-electrolytic plating films 3. On the other hand, the reflection plate material having the metal displacement film (the one obtained in the step (A4)) is immersed in the non-electrolytic plating solution, the metal in the metal displacement films is displaced with the plating metal to form non-electrolytic plating films on the parts of the reflecting surface which are not covered with the resist pattern (FIG. 4D or FIG. 5D).

As the non-electrolytic plating solution, a known non-electrolytic plating solution can be used so long as it includes a metal whose ionization tendency is lower than that of the metal which forms the reflecting surface of the base material 1 (in the case where metal displacement films are provided, a metal whose ionization tendency is lower than that of the metal which forms the metal displacement films) and also so long as it is capable of forming non-electrolytic plating films 3 whose reflectance is lower than that of the reflecting surface of the base material 1. For example, a non-electrolytic nickel plating solution, a non-electrolytic black nickel plating solution, a non-electrolytic copper plating solution, or the like may be used as the non-electrolytic plating solution. The conditions of the non-electrolytic plating process (for example, the immersion temperature and the immersion time) can be appropriately set according to the types of base material and non-electrolytic plating solution that are used, the type of formed metal displacement film, and the like.

It is preferable that the non-electrolytic plating film 3 formed in this manner has a thickness of, for example, approximately 0.2, 0.5, 1, 2, 3, 4, 5, 6, 7, 8, 9, 10, 15, or not less than 20 μm, and more preferably approximately 1 to 3 μm. If the thickness of the non-electrolytic plating elm 3 is less than the aforementioned lower limit, the reflectance of the part tends not to lower sufficiently. On the other hand, if the thickness is more than the aforementioned upper limit, the manufacturing time tends to be longer, resulting in a higher cost.

Furthermore, the reflectance of the non-electrolytic plating film 3 is preferably, for example, approximately 90, 80, 70, 60, 50, 40, 30, 20, or not more than 10%, and more preferably not more than 50%, of the part on the base material 1 where the non-electrolytic plating film 3 is not formed. If the percentage of the reflectance is more than 50%, the difference in reflectance between the reflection region and the non-reflection region becomes smaller, and the function as a reflection plate for an optical encoder will be lost. That is, this tends to make the correct positioning difficult. It is preferable that the reflectance of the non-electrolytic plating film 3 be lower than that of the reflecting surface, for example, approximately 80, 70, 60, 50, 40, 30, 20, 10, or not more than 5%, and more preferably not more than 30%.

Accordingly, from such a viewpoint of reflectance, for example in the case of using a base material at least the surface of which is made of an aluminum or an aluminum alloy as the base material 1, it is preferable that as a film for forming a non-reflection region, a coatingless, or grey- or black-colored non-electrolytic nickel plating film, a non-electrolytic nickel alloy plating film, or a non-electrolytic copper plating film be formed. It is more preferable that a non-electrolytic black nickel plating film or a non-electrolytic black nickel alloy plating film be formed. From the viewpoint of adhesion, uniformity, and corrosion-resistance, it is particularly preferable that a black-colored non-electrolytic nickel phosphorus plating film be formed.

In the present embodiment, after formation of the non-electrolytic plating film, the resist pattern is typically removed. However, in the case of using a transparent photoresist as the photoresist, the transparent resist pattern is not removed. The reflection plate material obtained in the step (A5), that is the reflection plate (FIG. 5D) whose surface has: the reflection regions made of the specular part whose surface is coated with the transparent resist pattern 12a; and the non-reflection regions made of the non-electrolytic plating films 3 can be used as a reflection plate for an optical encoder. Furthermore, in the present embodiment, one in which the whole surface of the reflection plate or the surface of the transparent resist pattern 12a shown in FIG. 5D is coated with a protection film 4 in the protection film formation step (described later) can be used as a reflection plate for an optical encoder.

(A6) Resist Pattern Removal Step

In the present embodiment, in the case where a photoresist other than a transparent photoresist is used as the photoresist, the resist pattern is typically removed. Note that, even in the case of using a transparent photoresist, the resist pattern may be removed.

Methods of removing a resist pattern include a method of immersing the reflection plate material (FIG. 4D) obtained in the step (A5) in a resist exfoliation solution. As for the resist exfoliation solution, one can be appropriately selected from among the conventionally known ones according to the type of photoresist that is used. Furthermore, the immersion conditions can be appropriately set according to the type of resist exfoliation solution that is used.

With the removal of the resist pattern in this manner, the parts of the reflecting surface of the base material 1 in which the non-electrolytic plating films 3 are not formed (the specular parts) are exposed. Thereby, it is possible to obtain a reflection plate for an optical encoder (FIG. 4E) that has: reflection regions composed of the specular parts; and non-reflection regions composed of the non-electrolytic plating films 3.

(A7) Protection Film Formation Step

In the present embodiment, in order to prevent deterioration of the surface, especially the reflection regions (the specular parts) due to oxidation and the like, it is preferable that the whole surface of the reflection plate, only the reflection regions, or the surface of the transparent resist pattern be coated with a protection film. The protection film can be formed by spreading a material for forming an oxidation-resistant film by use of a coating method such as spin coating, or formed by depositing a dielectric material by use of a vacuum process such as vacuum evaporation or sputtering.

The reflection plate for an optical encoder obtained by the aforementioned manufacturing method includes: a base material with a specular reflecting surface; and non-electrolytic plating films formed on some parts of the reflecting surface. The non-electrolytic plating films have low reflectance, and hence, function as non-reflection regions. On the other hand, the parts of the reflecting surface that are not covered with the non-electrolytic plating films (the specular parts) have high reflectance, and hence, function as reflection regions. In such a reflection plate for an optical encoder, the non-electrolytic plating film has high adhesion to the reflecting surface of the base material. Therefore, exfoliation between the non-electrolytic plating film and the base material is unlikely to occur.

In the present embodiment, the aforementioned manufacturing method does not use a vacuum process when forming the reflection regions and the non-reflection regions. Therefore, it is a method with law cost and high productivity compared with conventional manufacturing methods of reflection plates for an optical encoder. Furthermore, in the present embodiment, the non-reflection regions are formed by the non-electrolytic plating process. This allows for fine patterning.

Hereinafter is a description of examples. However, the present invention is not limited to the following examples. The adhesion of the reflection plate for an optical encoder was assessed by the following method.
(Adhesion)

A cellophane tape was stuck onto non-electrolytic black nickel plating films of a discoid member, and was peeled off quickly. An adhesion was assessed by the presence or absence of an exfoliation of the non-electrolytic black nickel plating film from the discoid member.

EXAMPLE 1

As a base material, an aluminum-alloy discoid member (24 mm in diameter, 4 mm in thickness), one surface of which was mirror machined, was used. On the minor-machined surface (reflecting surface) of the discoid member, a positive-type photoresist (manufactured by Tokyo Ohka Kogyo Co., Ltd.; product name: "TSMR-8800") was uniformly spread by use of a spinner. After spreading, the discoid member was subjected to a heating process at 100° C. for 30 minutes, to thereby perform prebake.

A photomask in which a pattern of an encoder was formed on a surface of a silica glass by use of chrome was brought into close contact with (adherently placed on) the positive-type photoresist coating film. A mercury lamp was used to irradiate g-line onto this from above the photomask for approximately 20 seconds, to thereby perform an exposure process.

After exposure, the photomask was removed, and the positive-type photoresist coating film was developed by use of a developer (manufactured by Tokyo Ohka Kogyo Co., Ltd.; product name: "NMD-3"). As a result, the non-exposed parts of the positive-type photoresist coating film remain on the discoid member, and the exposed parts were eluted to expose some parts of the reflecting surface of the discoid member.

The discoid member with a surface on which the resist pattern was formed in this manner was immersed for 30 seconds in a sodium hydroxide aqueous solution with a concentration of 12.5 percent by mass maintained at 55° C., to thereby perform a caustic process. As a result, the stain on the exposed parts of the reflecting surface was removed.

The discoid member was immersed for 10 seconds in a nitric acid aqueous solution with a concentration of 5 percent by mass (one in which a nitric acid with a concentration of 67.5 percent by mass was diluted by pure water) maintained at room temperature. As a result, the surface of the discoid member having been subjected to the caustic process was neutralized.

Next, the discoid member was immersed for one minute in a zinc displacement solution (manufactured by Kizai Corporation; product name: "SZ-II") maintained at room temperature. As a result, the aluminum in the exposed parts of the reflecting surface was displaced with zinc to form zinc films on the exposed parts.

The discoid member having the zinc films was immersed for 10 seconds in a nitric acid aqueous solution with a concentration of 5 percent by mass (one in which a nitric acid with a concentration of 67.5 percent by mass was diluted by pure water) maintained at room temperature. As a result, the zinc films were removed from the discoid member, thus exposing again the parts of the reflecting surface of the discoid member that were not covered with the photoresist film.

The discoid member was immersed for one minute in a zinc displacement solution (manufactured by Kizai Corporation; product name: "SZ-II") maintained at room temperature. As a result, the aluminum in the exposed parts of the reflecting surface was displaced with zinc, forming zinc films on the exposed parts again.

Next, the discoid member having the zinc films was immersed for 10 minutes in a non-electrolytic nickel plating solution (manufactured by Japan Kanigen Co., Ltd.; product name: "KANIBLACK SKZ")) maintained at 90°C. As a result, the zinc on the exposed parts was displaced with black nickel, forming non-electrolytic black nickel plating films with a thickness of approximately 2 μm on the exposed parts.

After that, the resist pattern on the surface of the discoid member was removed by use of a resist exfoliation solution, thus exposing the protected rest parts (the specular parts) of the reflecting surface of the discoid member. As a result, a reflection plate for an optical encoder whose surface has: reflection regions made of specular parts of the aluminum-alloy discoid member; and non-reflection regions made of non-electrolytic black nickel plating films was obtained.

Note that the discoid member was appropriately rinsed with pure water after each process.

When the adhesion of the obtained reflection plate for an optical encoder was assessed by the aforementioned method, the non-electrolytic black nickel plating films were not exfoliated from the discoid member at all. Therefore, a sufficient adhesive strength was confirmed on a practical basis.

EXAMPLE 2

On the reflecting surface of the aluminum-alloy discoid member that was used in Example 1, a transparent negative-type photoresist (manufactured by MicroChem Corporation; product name "SU-8 3050") was uniformly spread by use of a spinner. After spreading, the discoid member was subjected to a heating process at 95° C. for 30 minutes, to thereby perforin pre-bake.

The discoid member with a surface on which the transparent negative-type photoresist was formed was subjected to an exposure process similar to Example 1. After that, the discoid member was subjected to a development process similar to Example 1, the exception being that SU-8 Developer (product name) manufactured by MicroChem Corporation was used as the developer. Subsequently, the discoid member was subjected to a heating process at 95° C. for 30 minutes, to thereby perform post-bake.

Non-electrolytic black nickel plating films with a thickness of approximately 2 μm were formed on the exposed parts of the reflecting surface of the discoid member similar to Example 1, the exception being that a discoid member with a surface on which a transparent resist pattern was formed was used. As a result, a reflection plate for an optical encoder whose surface has: reflection regions which are made of the specular parts of the aluminum-alloy discoid member and which are covered with the transparent negative-type photoresist; and non-reflection regions made of the non-electrolytic black nickel plating films was obtained.

When the adhesion of the obtained reflection plate for an optical encoder was assessed by the aforementioned method, the non-electrolytic black nickel plating films were not exfoliated from the discoid member at all. Therefore, a sufficient adhesive strength was confirmed on a practical basis.

As is clear from the results of Examples 1 and 2, the reflection plates suffered from no exfoliation, and hence, were excellent in adhesion. Furthermore, in their manufacturing method, the vacuum process was not used for forming the reflection regions and the non-reflection regions. This enabled an efficient production of the reflection plate for an optical encoder at a low cost.

Figure 6:
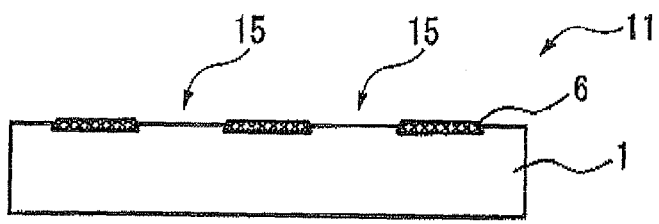
FIG. 6 is a cross-sectional view showing another embodiment of a reflection plate for an optical encoder.

FIG. 6 is a cross-sectional view showing a reflection plate for an optical encoder according to another embodiment. In the present embodiment, as shown in FIG. 6, a reflection plate 11 for an optical encoder includes: a base material 1 with a specular reflecting surface; and electrolytic oxide films 6 formed on some parts of the reflecting surface. The electrolytic oxide films 6 form non-reflection regions (low reflection regions, light-absorbing regions). The parts of the reflecting surface that are not electrolytically oxidized (the specular parts) form reflection regions 15.

In the present embodiment, the reflection region 15 is capable of reflecting light that is absorbed by the non-reflection region (the electrolytic oxide film 6). The electrolytic oxide film 6 as a non-reflection region has a reflectance lower than that of the reflection region 15. The electrolytic oxide films 6 may include a plurality of elements with the same shape and/or a plurality of elements whose shapes are different from each other.

In the reflection plate 11, the pattern for position detection includes: the electrolytic oxide film 6 as non-reflection regions; and the reflection regions 15. The minimum line width or minimum pitch of the pattern is set according to the resolution of the optical encoder, and can be set to, for example, 100, 90, 80, 70, 60, 50, 40, 30, 20, or not more than 10 μm, or alternatively to not less than 100 μm. A reflection plate having a pattern with a minimum line width or minimum pitch of not more than approximately 20 μm can be applicable to an optical encoder with a high resolution. Furthermore, a reflection plate having a minimum line width or minimum pitch of not more than approximately 10 μm can be applicable to an optical encoder with a higher resolution. In a reflection plate applicable to a high-resolution optical encoder, the minimum line width or minimum pitch of the pattern can be set to for example, approximately 20, 18, 16, 14, 12, 10, 8, 6, 4, or not more than 2 μm.

In the present embodiment, the electrolytic oxide films 6 formed on some parts of the reflecting surface of the base material 1 function as non-reflection regions. The constituent substances of the electrolytic oxide film 6 has direct bonding with the reflecting surface, and the adhesion of the electrolytic oxide film 6 with the reflecting surface (the specular surface) of the base material 1 is very high. Use of an electrolytic oxidation process (wet process) is advantageous for avoiding use of a vacuum process when forming the reflection regions and the non-reflection regions, and/or for reducing the cost. Furthermore, use of an electrolytic oxidation process is advantageous for forming a high-resolution pattern, securing a predetermined film thickness, and/or obtaining uniformity in film thickness, and is preferably applicable to a reflection plate having a pattern applicable to a high-resolution optical encoder.

Figure 5B:
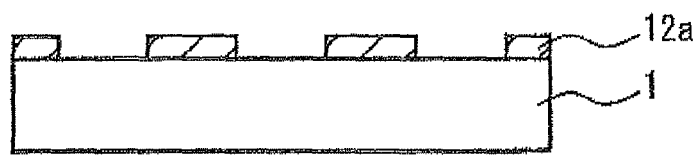
FIG. 5B is a cross-sectional view showing the reflection plate material of FIG. 5A after formation of a transparent resist pattern thereon by being subjected to exposure and development.
Figure 5C:
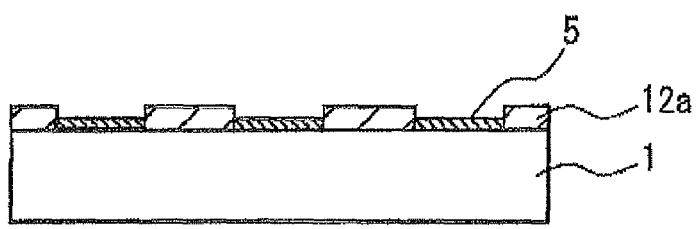
FIG. 5C is a cross-sectional view showing the reflection plate material of FIG. 5B after a metal displacement film is formed thereon.
Figure 5D:
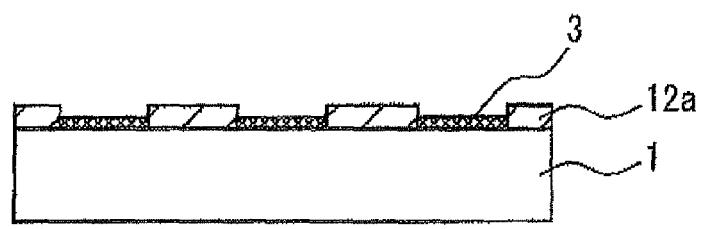
FIG. 5D is a cross-sectional view showing the reflection plate after the metal displacement film of the reflection plate material shown in FIG. 50 is displaced with a non-electrolytic plating film.
Figure 7:
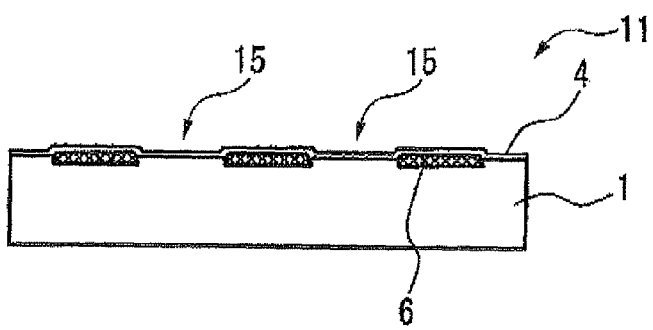
FIG. 7 is a cross-sectional view showing one example of a reflection plate provided with a protection film.
Figure 8A:
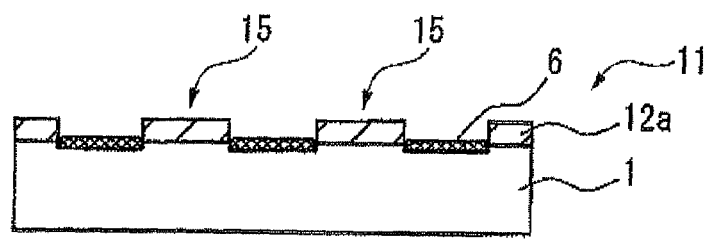
FIG. 8A is a cross-sectional view showing another example of a reflection plate provided with a protection film.

In the present embodiment, in order to prevent deterioration of the surface, especially the reflection region (specular part) 15 due to oxidation or the like, at least the reflection region 15 can be covered with protection film(s) (coating film(s)) 4 and/or 12a, as shown in FIG. 7, FIG. 8A, and FIG. 5B. In the present embodiment, it is possible for the light reflected from the reflection region 15 to pass through the protection film(s) 4 and/or 12a.

Figure 8B:
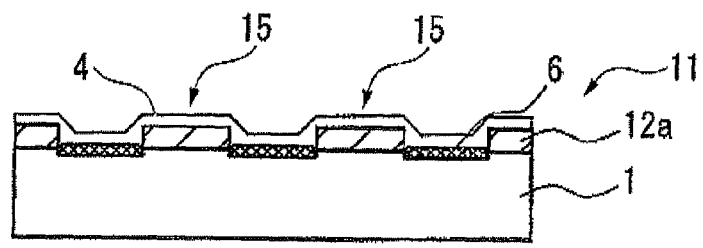
FIG. 8B is a cross-sectional view showing another example of a reflection plate provided with a protection film.

In FIG. 7, the whole surface of the base material 1 including the reflection regions 15 and the non-reflection regions (the electrolytic oxide films 6) is covered with the protection film 4. In FIG. 8A, only the reflection regions 15 are each covered with a protection film 12a. In FIG. 8B, only the reflection regions 15 are each covered with a first protection film 12a and the whole surface of the base material 1 including the reflection regions 15 and the non-reflection regions (the electrolytic oxide films 6) is covered with a second protection film 4. As a material for the protection films 4 and 12a, a variety of known materials can be used.

In FIG. 8A, the photoresist used for the patterning of the electrolytic oxide film 6 can be used as the protection films 12a. In this case, the transparent photoresist used in the manufacturing method (described later) is allowed to remain on the reflection regions 15 to protect the reflection regions 15. In FIG. 8B, the whole surface of the base material 1 including the aforementioned remaining transparent resist pattern (the protection films 12a) and the non-reflection regions (the electrolytic oxide films 6) can be further covered with the protection film 4. Note that "transparent" means transparent to the light that is used for the optical encoder.

Figure 9A:
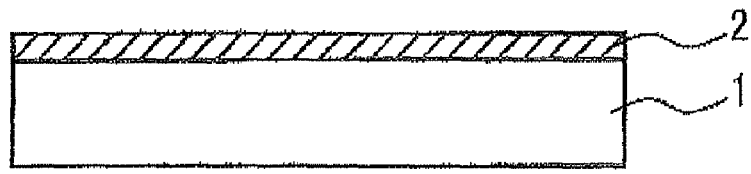
FIG. 9A is a cross-sectional view showing a reflection plate material after formation of a photoresist film.

Next is a description of a manufacturing method of the reflection plate 11. Furthermore, respective elements used for the reflection plate 11 will be additionally described. In the present embodiment, some parts of the specular reflecting surface provided on the base material 1 are subjected to an electrolytic oxidation process to form electrolytic oxide films 6. To be more specific, a manufacturing method may be used that includes at least: (B1) a photoresist film formation step, (B2) a resist pattern formation step, and (B3) an electrolytic oxidation step, and further includes, as required: (B4) a dyeing step, (135) a resist pattern removal step, and (B6) a protection film formation step, the steps being as follows, (B1) Photoresist Film Formation Step First, a base material 1 with a specular reflecting surface is prepared, and a photoresist film 2 is formed on the reflecting surface (FIG. 9A). The base material 1 is not particularly limited so long as it is a base material having a specular reflecting surface and allows for formation of a surface with a lower reflectance than that of the reflecting surface by electrolytic oxidation. As such a base material 1, a base material made of an aluminum or an aluminum alloy is preferable because it is possible to form a preferable reflection plate. Furthermore, as the base material 1, one in which a metal layer made of an aluminum alloy or the like is formed on the surface of a host material such as a glass substrate or a transparent resin substrate can be used. In this case, the metal layer preferably has a thickness of approximately 2, 4, 6, 8, 10, 15, or not less than 20 μm, and more preferably has a thickness of not less than 10 μm. With a thickness of less than 10 μm, it tends to be difficult to form an electrolytic oxide film with a sufficient thickness.

The specular reflecting surface of the base material 1 can be formed by mirror machining methods. As the mirror machining method, conventionally known mirror machining methods such as polishing and grinding can be used. Among these, grinding is preferable because it can form a desired reflecting surface at a low cost.

The reflectance of the reflecting surface is preferably, for example, approximately 40, 50, 60, 70, 80, or not less than 90%, and more preferably not less than 70%. If the reflectance of the reflecting surface is less than 70%, a reflection plate with high accuracy tends to be unobtainable. Furthermore, the thickness, size, and shape of the base material 1 are appropriately determined according to desired applications. Note that "reflectance" means reflectance with respect to the light used for the optical encoder.

On such a reflecting surface of the base material 1, a photoresist film 2 is formed by a conventionally known method. For example, a coating apparatus such as a spinner is used to spread a photoresist uniformly on the reflecting surface to form a photoresist film 2. The photoresist may be either positive type or negative type so long as it does not deteriorate through electrolytic oxidation.

Figure 10A:
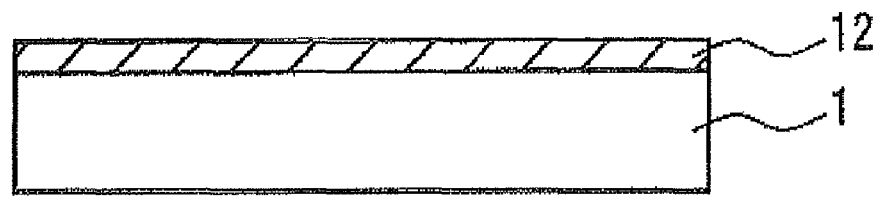
FIG. 10A is a cross-sectional view showing a reflection plate material after formation of a transparent photoresist film.

If a transparent resist pattern (protection films 12*a*) is allowed to remain on the reflection region 15 of the reflection plate as shown in FIG. 8A, a transparent photoresist is used as the photoresist to form a transparent photoresist film 12 (FIG. 10A). The transparent photoresist may be either positive type or negative type so long as it does not deteriorate through electrolytic oxidation.

The formed photoresist film 2 or the transparent photoresist film 12 is subjected to a heating process (pre-bake) under predetermined conditions. The pre-bake conditions are appropriately set according to the type of photoresist that is used, (B2) Resist Pattern Formation Step Next, a photomask with a desired encoder pattern formed thereon is placed in contact with or proximity to the photoresist film 2 or the transparent photoresist film 12. Then, a light source such as a mercury lamp is used to irradiate energy rays at a predetermined wavelength onto the photoresist film 2 or the transparent photoresist film 12 from above the photomask, to thereby expose the photoresist film 2 or the transparent photoresist film 12 for a predetermined period of time. The exposure conditions are appropriately set according to the type of photoresist that is used.

The photomask is not particularly limited. Usable photomasks include, for example, one in which an encoder pattern is formed on a glass substrate (preferably, a silica glass substrate) by use of chrome or the like.

Figure 9B:
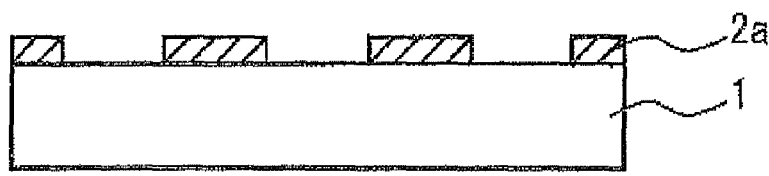
FIG. 9B is a cross-sectional view showing the reflection plate material after formation of a photoresist pattern.
Figure 10B:
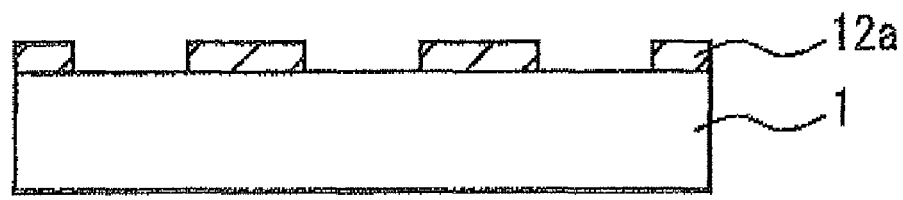
FIG. 10B is a cross-sectional view showing the reflection plate material of FIG. 10A after formation of a transparent resist pattern thereon by being subjected to exposure and development.

After exposure, the photomask is removed, and a predetermined developer is used to perform a development. The type of developer and the development conditions are determined according to the type of photoresist that is used. In the case of the positive-type photoresist film, through the development process, the non-exposed parts remain on the base material 1 to form the resist pattern 2*a* or the transparent resist pattern 12*a*, and the exposed parts are eluted to expose some parts of the specular surface of the base material 1. On the other hand, in the case of the negative-type photoresist through the development process, the exposed parts remain on the base material 1 to form the resist pattern 2*a* or the transparent resist pattern 12*a*, and the non-exposed parts are eluted to expose some parts of the reflecting surface of the base material 1. In this manner, it is possible to obtain a reflection plate material (FIG. 9B or FIG. 10B) in which the resist pattern 2*a* or the transparent resist pattern 12*a* is formed on the surface of the base material 1. Note that, as required, the resist pattern may be subjected to a heating process (post-bake) under predetermined conditions. The post-bake conditions are appropriately set according to the type of photoresist that is used.

(B3) Electrolytic Oxidation Step

Next, the reflection plate material obtained in the step (B2) is connected to electrodes, and is immersed in an electrolytically oxidizing solution. The electrolytically oxidizing solution is appropriately determined according to the type of base material 1 that is used. For example, in the case where a base material at least the surface of which is made of an aluminum or an aluminum alloy is used as the base material 1, an anodizing solution (alumite treatment liquid) in which 1 L of pure water is mixed with 180 g of sulfuric acid with a concentration of 75% is used as the electrolytically oxidizing solution:

Current with a predetermined current density is applied to the reflection plate material, which is immersed in the electrolytically oxidizing solution, for a predetermined period of time. The temperature of the electrolytically oxidizing solution, the current density, and the period of time for the current application are appropriately determined according to the types of base material 1 and the electrolytically oxidizing solution that are used.

Figure 9C:
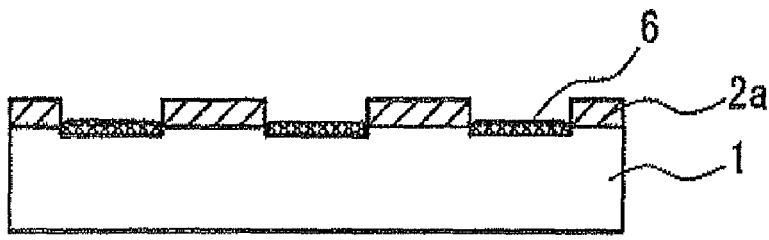
FIG. 9C is a cross-sectional view showing the reflection plate material after formation of an electrolytic oxide film thereon.
Figure 10C:
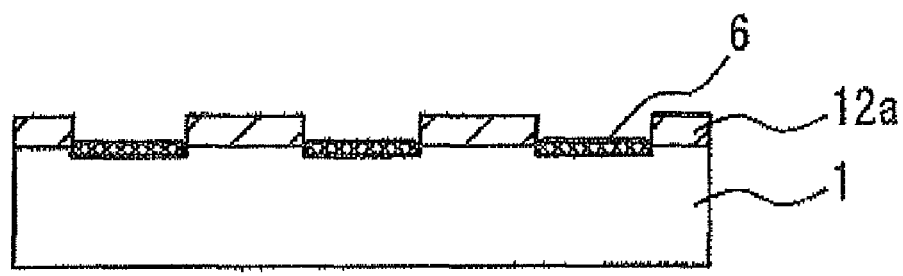
FIG. 10C is a cross-sectional view showing the reflection plate material of FIG. 10B after formation of an electrolytic oxide film thereon.

Through the current application, the exposed parts of the reflecting surface are electro-oxidized, to thereby form electrolytic oxide films 6 whose surfaces have a myriad of fine pores formed (FIG. 9C or FIG. 10C). The type of electrolytic oxide film 6 depends on the type of base material 1 that is used. If the base material 1 is made of aluminum, the electrolytic oxide film 6 is aluminum oxide film. If the base material 1 is made of aluminum alloy, the electrolytic oxide film 6 is aluminum alloy oxide film.

The electrolytic oxide film 6 has a typical thickness of approximately 2, 5, 10, 20, 30, 40, 50, 60, 70, 80, 90, or 100 µm, preferably approximately 10 to 70 µm, and more preferably approximately 15 to 50 µm. If the thickness of the electrolytic oxide film 6 is less than 15 µm, the reflectance of this part tends not to lower sufficiently. On the other hand, with a thickness over 50 µm, the manufacturing time tends to be longer, resulting in a higher cost. In the electrolytic oxide film 6, typically a part thereof is formed so as to be raised above the level of the reflecting surface of the base material 1, and the remaining part is formed below the level of the reflecting surface of the base material 1. The thickness of the raised part is typically approximately ⅓ to ½ of the whole thickness of the electrolytic oxide film 6.

The reflectance of the electrolytic oxide film 6 that is formed in this manner is preferably, for example, approximately 90, 80, 70, 60, 50, 40, 30, 20, or not more than 10%, and more preferably not more than 50%, of the reflectance of the reflecting surface of the base material 1. If the percentage of the reflectance of the electrolytic oxide film 6 with respect to that of the reflecting surface of the base material 1 is more than 50%, the difference in reflectance between the reflection region and the non-reflection region tends to be small, correct positioning tends to be difficult. The reflectance of the electrolytic oxide film 6 is preferably lower than that of the reflecting surface. It is, for example, preferably approximately 80, 70, 60, 50, 40, 30, 20, 10, or not more than 5%, and more preferably not more than 30%.

In the present embodiment, after subjection to the dyeing process (described later) as required, the resist pattern is typically removed. However, in the case of using a transparent photoresist as the photoresist, the transparent resist pattern is not removed. Instead, the reflection plate material obtained in the step (B3), that is the reflection plate material (FIG. 10C) whose surface has: the reflection regions made of the specular part whose surface is coated with the transparent resist pattern 12*a*; and the non-reflection regions made of the electrolytic oxide films 6, can be used as a reflection plate 11 for an optical encoder. Furthermore, one in which the electrolytic oxide films 6 of the reflection plate material shown in FIG. 10C are dyed in the dyeing step (described later), or one in which the whole surface of the reflection plate material or the surface of the transparent resist pattern 12*a* shown in FIG. 10C is coated with a protection film 4 in the protection film formation step (described later) can be used as a reflection plate 11 for an optical encoder.

(B4) Dyeing Step

In the present embodiment, in order to widen the difference in reflectance between the reflection region and the non-reflection region, it is preferable that the electrolytic oxide films 6 (the non-reflection regions) be dyed. This decreases the reflectance of the electrolytic oxide film 6. It is preferable that to prevent the reflection regions from being dyed, the dyeing process be performed before the resist pattern is removed.

Dyeing methods include one in which the reflection plate material that is obtained in the electrolytic oxidation step is immersed in a dye solution to impregnate the electrolytic oxide films 6 with the dye. Furthermore, because the impregnated dye has gone into the pores (holes) of the electrolytic oxide films 6, the dye can be sealed in the pores by sealing the entrances of the pores, to thereby prevent deceleration at the time of a rinsing process or the like. This sealing can be performed by immersing the reflection plate material after the dyeing process in a sealing solution.

As the dye solution, a black dye solution in which a black dye is dissolved into pure water, and a dye solution with a deep color like black can be used. Of these, the black dye solution is preferable in that it is capable of further reducing the reflectance of the non-reflection regions. As the sealing solution, one in which a chemical based on nickel acetate, cobalt acetate, or the like is dissolved in water can be used.

(B5) Resist Pattern Removal Step

In the present embodiment, in the case where a photoresist other than a transparent photoresist is used as the photoresist, the resist pattern is typically removed. Note that, even in the case of using a transparent photoresist; the resist pattern may be removed.

Methods of removing a resist pattern include a method of immersing the reflection plate material obtained in the electrolytic oxidation step or the dyeing step in a resist remover. As for the resist remover, one can be appropriately selected from among the conventionally known ones and used according to the type of photoresist that is used. Furthermore, the immersion conditions are appropriately set according to the type of resist remover that is used.

Figure 9D:
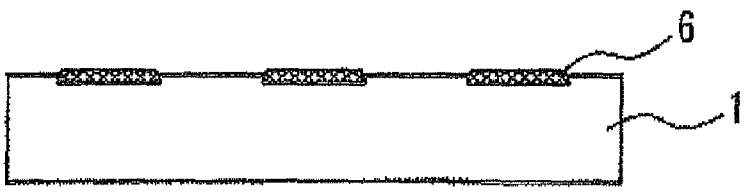
FIG. 9D is a cross-sectional view showing the reflection plate after removal of the resist pattern.

With the removal of the resist pattern in this manner, the parts of the reflecting surface of the base material 1 which are not electrolytically oxidized (the specular parts) are exposed. Thereby, it is possible to obtain a reflection plate (FIG. 9D) that has: reflection regions made of the specular parts; and non-reflection regions made of the electrolytic oxide films 6.

(B6) Protection Film Formation Step

In the present embodiment, in order to prevent deterioration of the surface, especially the reflection regions (the specular parts) due to oxidation and the like, it is preferable that the whole surface of the reflection plate, only the reflection regions, or the surface of the transparent resist pattern be coated with a protection film.

The protection film can be formed by spreading a material for forming an oxidation-resistant film by use of a coating method such as spin coating, or formed by depositing a dielectric material by use of a vacuum process such as vacuum evaporation or sputtering.

In the present embodiment, the reflection plate for an optical encoder obtained by the aforementioned manufacturing method electrolytically oxidizes the base material surface directly. This prevents the exfoliation between the formed electrolytic oxide films and the base material. Furthermore, the aforementioned manufacturing method does not use a vacuum process when forming the reflection regions and the non-reflection regions. Therefore, it is a method low in cost and high in productivity compared with conventional manufacturing methods of reflection plates for an optical encoder.

Hereunder is a description of examples. However, the present invention is not limited to the following examples. The presence or absence of an exfoliation of the reflection plate for an optical encoder was assessed by the following method.

(Presence or Absence of Exfoliation)

A cellophane tape was stuck onto electrolytic oxide films of a discoid member, and was peeled off quickly. The presence or absence of an exfoliation of the electrolytic oxide films from the discoid member was checked.

EXAMPLE 3

As a base material, an aluminum-alloy discoid member (24 mm in diameter, 4 mm in thickness), one surface of which was mirror machined, was used. On the mirror-machined surface (reflecting surface) of the discoid member, a positive-type photoresist (manufactured by Tokyo Ohka Kogyo Co., Ltd.; product name: "TSMC-8800") was uniformly spread by use of a spinner. After spreading, the discoid member was subjected to a heating process at 100° C. for 30 minutes, to thereby perform prebake.

A photomask in which a pattern of an encoder was formed on a surface of a silica glass by use of chrome was brought into close contact with (adherently placed on) the positive-type photoresist coating film. A mercury lamp was used to irradiate the g-line onto this front above the photomask for approximately 20 seconds to thereby perform an exposure process.

After exposure, the photomask was removed, and the positive-type photoresist coating film was developed by use of a developer (manufactured by Tokyo Ohka Kogyo Co., Ltd.; product name: "NMD-3"). The non-exposed parts of the positive-type photoresist coating film remain on the discoid member, and the exposed parts were eluted to expose some parts of the reflecting surface of the discoid member.

An electrode was connected to the discoid member with the resist pattern formed on its surface in this manner. This discoid member was immersed in an anodizing solution (one in which 1 L of pure water is mixed with 180 g of sulfuric acid with a concentration of 75%) maintained at 20° C., and current with a current density of 2 A/dm$^2$ was applied thereto for 40 minutes. As a result, the aluminum alloy on the exposed parts of the reflecting surface was anodized, and aluminum alloy oxide films were formed on some parts of the surface of the discoid member. This aluminum alloy oxide films had a thickness of approximately 24 μm. To be more specific, the part of the aluminum alloy oxide films formed above the level of the reflecting surface of the discoid member had a thickness of approximately 8 μm, and the part of it formed below the level of the reflecting surface had a thickness of approximately 16 μm. Furthermore, when the aluminum alloy oxide films were observed under a microscope, it was confirmed that a myriad of fine pores (holes) were formed in their surfaces.

Next, the discoid member having the aluminum alloy oxide film on some parts of its reflecting surface was immersed for 15 minutes in a black dye solution (one in which 10 g of a black dye (manufactured by Okuno Chemical Industries Co., Ltd., product name: "TAC-413") was dissolved in 1 L of pure water) maintained at 60° C. This allowed the dye to go into the pores of the aluminum alloy oxide films, thus dyeing the aluminum alloy oxide film black.

The discoid member in which the aluminum alloy oxide films were dyed black in this manner was immersed for 15 minutes in a sealing solution (one in which 2 ml of Lyogen WL Liq (product name; manufactured by Clariant) was dissolved in 1 L of pure water) maintained at 95° C. to close the entrances of the pores of the aluminum alloy oxide films. Thus, the black dye was sealed in the pores. After that, the discoid member was immersed and rinsed for approximately 3 seconds in pure water maintained at 70° C.

Next, the resist pattern on the surface of the discoid member was removed by use of an exfoliation solution to expose the protected remaining parts (the specular parts) on the reflecting surface of the discoid member. As a result, a reflection plate for an optical encoder including: reflection regions made of the specular parts of the aluminum-alloy discoid member; and non-reflection regions made of the black-dyed aluminum alloy oxide films was obtained.

When the obtained reflection plate for an optical encoder was checked for the presence or absence of an exfoliation by the aforementioned method, the aluminum alloy oxide films were not exfoliated from the discoid member at all. Therefore, a sufficient adhesive strength was confirmed on a practical basis.

EXAMPLE 4

On the reflecting surface of the aluminum-alloy discoid member that was used in Example 3, a transparent positive-type photoresist (manufactured by MicroChem Corporation; product name "SU-8 50") was uniformly spread by use of a spinner. After spreading, the discoid member was subjected to a heating process at 65° C. for 6 minutes, and subsequently at 95° C. for 20 minutes, to thereby perform pre-bake The discoid member with a surface on which the transparent positive-type photoresist was formed was subjected to an exposure process similarly to Example 3. After that, the discoid member was subjected to a development process similar to Example 3, the exception being that SU-8 Developer (product name) manufactured by MicroChem Corporation was used as a developer. Subsequently, the discoid member was subjected to a heating process at 65° C. for 2 minutes, and subsequently at 95° C. for 5 minutes, to thereby perform post-bake.

Electrodes were connected to the discoid member with the transparent resist pattern formed on its surface in this manner. Then, aluminum alloy oxide films were formed on some parts of the surface of the discoid member similar to Example 3. The aluminum alloy oxide films had a thickness of approximately 24 μm. To be more specific, the part of the aluminum alloy oxide films formed above the level of the reflecting surface of the discoid member had a thickness of approximately 8 μm, and the part of it formed below the level of the reflecting surface had a thickness of approximately 16 μm. Furthermore, when the aluminum alloy oxide films were observed under a microscope, it was confirmed that a myriad of fine pores were formed in their surfaces.

After that, the aluminum alloy oxide film was dyed black, had the black dye sealed, and rinsed with pure water in a manner similar to the case of Example 3. In this manner, a reflection plate for an optical encoder whose surface includes: a reflection region that is made of the specular part of the aluminum-alloy discoid member and is covered with the transparent positive-type photoresist; and a non-reflection region made of the black-dyed aluminum alloy oxide film was obtained.

When the obtained reflection plate for an optical encoder was checked for the presence or absence of exfoliation by the aforementioned method, the aluminum alloy oxide films were not exfoliated from the discoid member at all. Therefore, a sufficient adhesive strength was confirmed on a practical basis.

As is clear from the results of Examples 3 and 4, the reflection plates (Example 3 and 4) were free from the occurrence of exfoliation, and hence, were excellent in adhesion. Furthermore, in the aforementioned manufacturing method, a vacuum process was not used when the reflection regions and the non-reflection regions were formed. Therefore, it was a method low in cost and high in productivity.

The reflection plates 10, 11 according to the aforementioned embodiments are applicable to various types of encoders such as a rotary encoder and a linear encoder. Furthermore, as an encoder pattern in each of the reflection plates 10, 11, various patterns such as an incremental pattern and an absolute pattern can be used.

Figure 11:
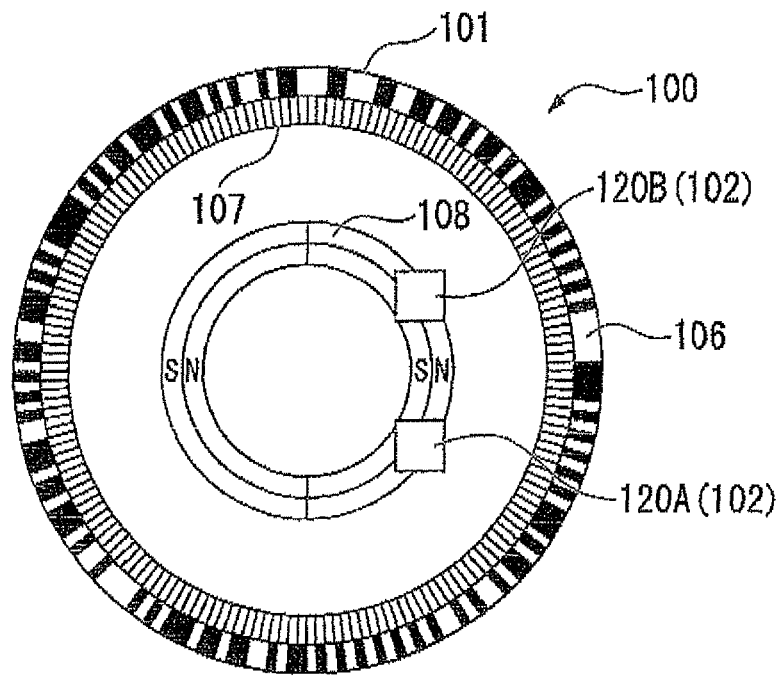
FIG. 11 is a plan view schematically showing one example of an encoder.
Figure 12:
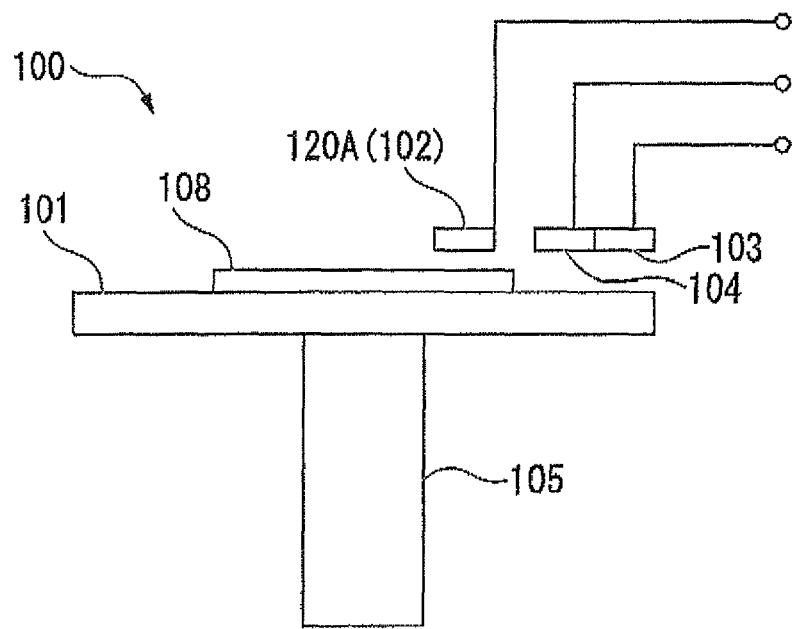
FIG. 12 is a side view schematically showing a rough construction of the encoder shown in FIG. 11.
Figure 13A:
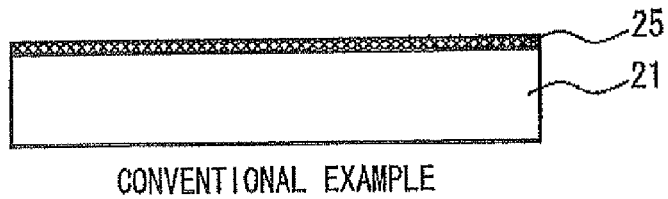
FIG. 13A is a cross-sectional view showing a reflection plate material after formation of a non-reflection layer in a conventional manufacturing method of a reflection plate for an optical encoder.
Figure 13B:
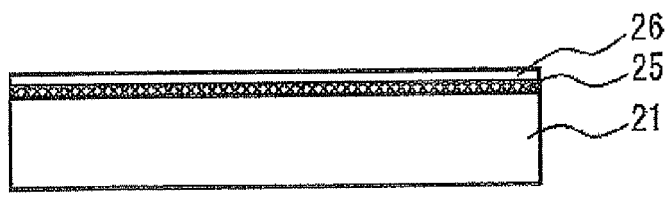
FIG. 13B is a cross-sectional view showing the reflection plate material of FIG. 13A after formation of a reflection layer on its non-reflection layer.
Figure 13C:
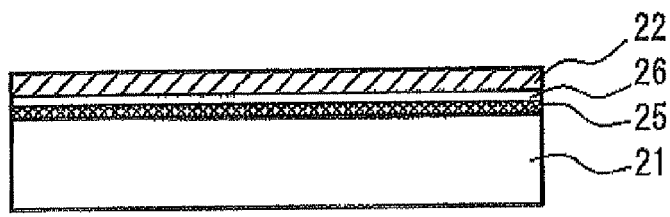
FIG. 13C is a cross-sectional view showing the reflection plate material of FIG. 133 after formation of a photoresist film on its reflection layer.
Figure 13D:
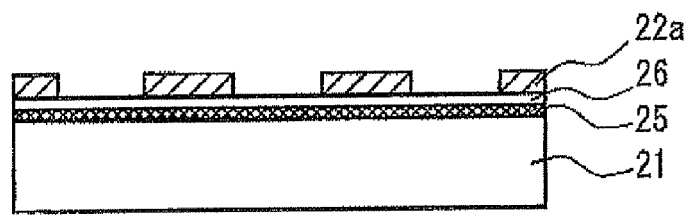
FIG. 13D is a cross-sectional view showing the reflection plate material of FIG. 13C after formation of a resist pattern thereon by being subjected to exposure and development.
Figure 13E:
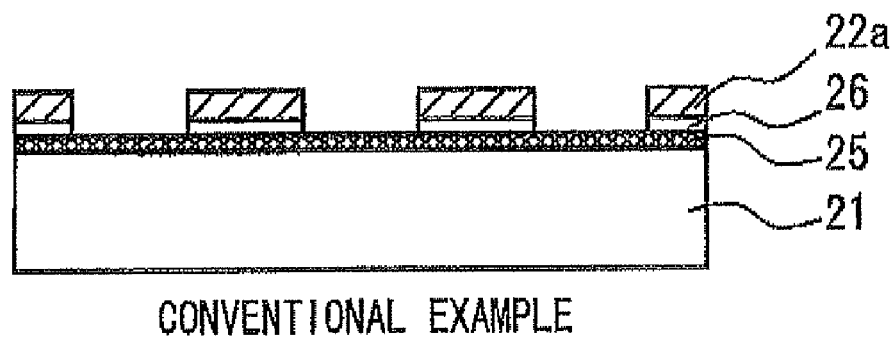
FIG. 13E is a cross-sectional view showing the reflection plate material of FIG. 13D after etching.
Figure 13F:
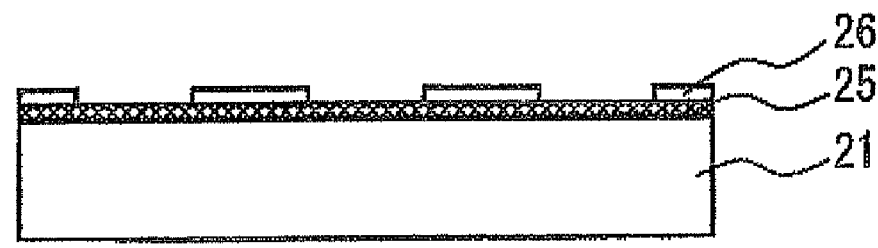
FIG. 13F is a cross-sectional view showing a reflection plate obtained by removing the resist pattern of the reflection plate material shown in FIG. 13E.

Next is a description of one example of an encoder to which the reflection plates 10, 11 according to the aforementioned embodiments are applicable. FIG. 11 is a plan view schematically showing one example of an encoder. FIG. 12 is a side view showing a rough construction of the encoder of FIG. 11.

In FIG. 11 and FIG. 12, an encoder 100 is a multi-turn absolute rotary encoder. It includes: a scale plate (a reflection plate) 101; detection portions 102, 103, 104; and a rotary shaft 105. The scale plate 101 and the detection portions 102 to 104 move relative to each other. The rotary shaft 105 is rotatable. The scale plate 101 is attached to the rotary shaft 105.

On the scale plate 101, there are provided a first track 106 for an absolute pattern, a second track 107 for an incremental pattern, and a third track 108 for counting the number of rotations. The scale plate 101 has a substantially discoid (disc-like) or annular shape. The first track 106, the second track 107, and the third track 108 have an annular shape, and are arranged concentrically. The first track 106 is arranged in an outermost circumference of the scale plate 101, and has a 1-track-type absolute pattern arranged along the circumferential direction. The second track 107 is arranged inner than the first track 106, and has an incremental pattern arranged along the circumferential direction. The third track 108 is arranged inner than the second track 107, and has a magnetic S-N pattern. Each pattern of the first and second tracks 106, 107 is an optical pattern. The third track 108 is made of, for example, a magnet disc.

The detection portion 102 includes: magnetic sensors 120A, 120B that are placed so as to face the third track 108 of the scale plate 101; and a signal processing portion (not shown in the figures) for processing signals from the magnetic sensors 120A, 120B. The detection portion 102 is capable of outputting biphase signals (for examples, signals out of phase from each other by 90°) in accordance with the number of rotations of the third track 108.

The detection portions 103, 104 each include: a light-receiving element for receiving light reflected from the scale plate 101, the light being from a light projector (not shown in the figures); and a signal processing portion for processing signals from the light-receiving element. As detection light, dispersed light from an LED or the like is used for example. In this case, detection light converted into substantially parallel rays via a predetermined optical element enters the scale plate 101. Reflected rays from the scale plate 101 enter the light-receiving elements of the detection portions 103, 104. The detection portion 103 is capable of detecting reflected rays from the absolute pattern of the first track 106. The detection portion 104 is capable of detecting reflected rays from the incremental pattern of the second track 107.

In the encoder 100, it is possible to measure the relative rotational position (rotation angle) of the scale plate 101 with high accuracy based on the signals from the detection portions 102 to 104. As the scale plate 101, either of the reflection plates 10, 11 according to the aforementioned embodiments can be used. As a result, the encoder 100 can be low in cost and have excellent durability.

A detailed construction of a multi-turn absolute rotary encoder is disclosed in, for example, Japanese Patent Application Publication Nos. H09-273943, H09-089591, H09-061195, and 2005421593.

While embodiments of the present invention have been described as above, all of the aforementioned constituent elements can be appropriately combined and used in the present invention. Furthermore, one or some of the constituent elements may be unused.

As far as is permitted by the law, the disclosures in the patent documents cited in the above respective embodiments and modified examples are incorporated herein by reference.

INDUSTRIAL APPLICABILITY

The reflection plate for an optical encoder of the present invention is useful as, for example, a reflection plate for an optical encoder that is used in a severe environment and/or a reflection plate for an optical encoder that requires a high resolution. Furthermore, the manufacturing method of a reflection plate for an optical encoder of the present invention is low in equipment cost, and hence, is useful for reducing the cost of the reflection plate for an optical encoder.

The invention claimed is:

1. A reflection plate for an optical encoder, comprising:
   a base material with a reflecting surface;
   a film that is formed on a part of the reflecting surface with a pattern, and includes a non-electrolytic plating film or an electrolytic oxide film as a non-reflection region;
   a first coating film that is used for a pattering of the film, and that is capable of transmitting light reflected from the reflecting surface and covers at least a part of a region of the reflecting surface on which the film is not formed; and
   a second coating film that covers the first coating film and the film.

2. The reflection plate for an optical encoder according to claim 1, wherein
   the reflecting surface is made of an aluminum or an aluminum alloy.

3. The reflection plate for an optical encoder according to claim 1, wherein
   the non-electrolytic plating film includes a non-electrolytic nickel plating film or a non-electrolytic nickel alloy plating film.

4. The reflection plate for an optical encoder according to claim 1, wherein
   the non-electrolytic plating film includes a black non-electrolytic plating film.

5. The reflection plate for an optical encoder according to claim 1, wherein
   the electrolytic oxide film includes an aluminum oxide film or an aluminum alloy oxide film.

6. The reflection plate for an optical encoder according to claim 1, wherein
   the electrolytic oxide film is dyed.

7. The reflection plate for an optical encoder according to claim 1, wherein
   the film has direct bonding with the reflecting surface.

8. The reflection plate for an optical encoder according to claim 1, wherein
   the coating film includes a transparent photoresist film.

9. An optical encoder, comprising the reflection plate for an optical encoder according to claim 1.

10. A manufacturing method of a reflection plate for an optical encoder, comprising:
    preparing a base material with a reflecting surface;
    forming a first coating film that is capable of transmitting light reflected from the reflecting surface and covers the reflecting surface;
    exposing a part of the reflecting surface which is covered by the first coating film as a pattern;
    forming a film on a part of the exposed reflecting surface, in which the film includes a non-electrolytic plating film or an electrolytic oxide film as a non-reflective region; and
    forming a second coating film that covers the first coating film and the film.

11. The manufacturing method of a reflection plate for an optical encoder according to claim 10, wherein
    the formation of the film comprises subjecting a part of the reflecting surface to a non-electrolytic plating process.

12. The manufacturing method of a reflection plate for an optical encoder according to claim 10, wherein
    the formation of the film comprises:
       forming a metal displacement film on a part of the reflecting surface, in which the metal displacement film includes a metal whose ionization tendency is lower than that of a metal forming the reflecting surface; and
       displacing the metal displacement film with the non-electrolytic plating film which includes a metal whose ionization tendency is lower than that of the metal forming the metal displacement film.

13. The manufacturing method of a reflection plate for an optical encoder according to claim 10, wherein
    the formation of the film comprises subjecting a part of the reflecting surface to an electrolytic oxidation.

14. The manufacturing method of a reflection plate for an optical encoder according to claim 13, wherein
    the formation of the film further comprises dyeing the electrolytic oxide film.

15. A reflection plate for an optical encoder, comprising:
    a base material with a reflecting surface;
    a transparent photoresist film that is patterned on a part of the reflecting surface and protects a part of the reflecting surface; and
    a film formed as a non-reflection region on at least a part of a region where the photoresist film is not formed on the reflecting surface, in which the film includes a non-electrolytic plating film or an electrolytic oxide film.

16. A manufacturing method of a reflection plate for an optical encoder, comprising:
    preparing a base material with a reflecting surface;
    forming a first coating film that is capable of transmitting light reflected from the reflecting surface and covers the reflecting surface;
    eluting a part of the first coating film as a pattern area;
    forming a film on the pattern area, in which the film includes a non-electrolytic plating film or an electrolytic oxide film, as a non-reflection region; and
    forming a second coating film that covers the first coating film and the film.

* * * * *